United States Patent Office

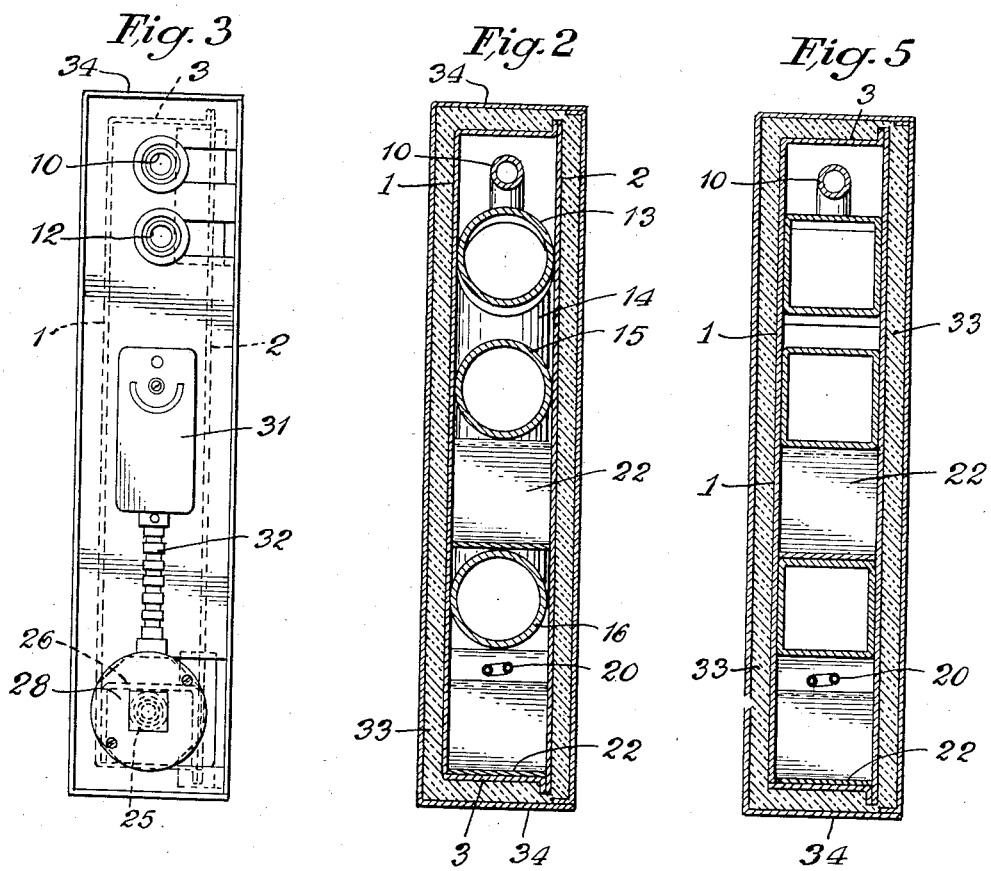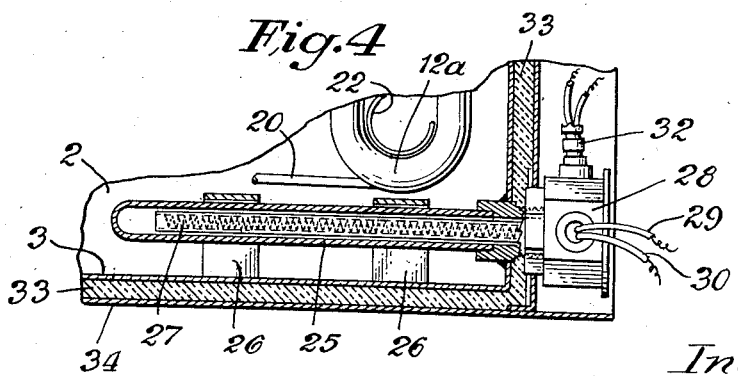

2,885,866
Patented May 12, 1959

2,885,866

HEAT EXCHANGE ASSEMBLY AND CONTROL

Herman W. Kleist, Hollywood, and John E. Hutchinson, Arlington Heights, Ill., assignors to Dole Refrigerating Company, Chicago, Ill., a corporation of Illinois Application April 28, 1955, Serial No. 504,576

2 Claims. (Cl. 62—156)

Our invention relates to an improvement in heat exchange elements for use, for example, in refrigeration. It has for one purpose to provide a heat exchange element useful, for example, in the defrosting of evaporators cooled by a volatile refrigerant.

Another purpose is to provide a self-contained heat exchange unit or plate which is compact and efficient, and which can be shipped, handled, and installed as a unit.

Another purpose is to provide such a plate in which a heat storage body, heating means therefor, and an adjustable heat control for the heating means, are included in the unit.

Another purpose is to provide such a unit of small bulk and of convenient shape.

Another purpose is to provide such a unit with a heat responsive control which may be adjusted to suit various conditions.

Other purposes will appear from time to time in the course of the specification and claims.

We illustrate our invention more or less diagrammatically in the accompanying drawings, wherein:

Figure 2 is a section on the line 2—2 of Figure 1;

Figure 3 is an end view of the structure of Figure 1;

Figure 4 is a detail section; and

Figure 5 is a section through a variant form.

Like parts are indicated by like symbols throughout the specification and drawings.

Figure 1:
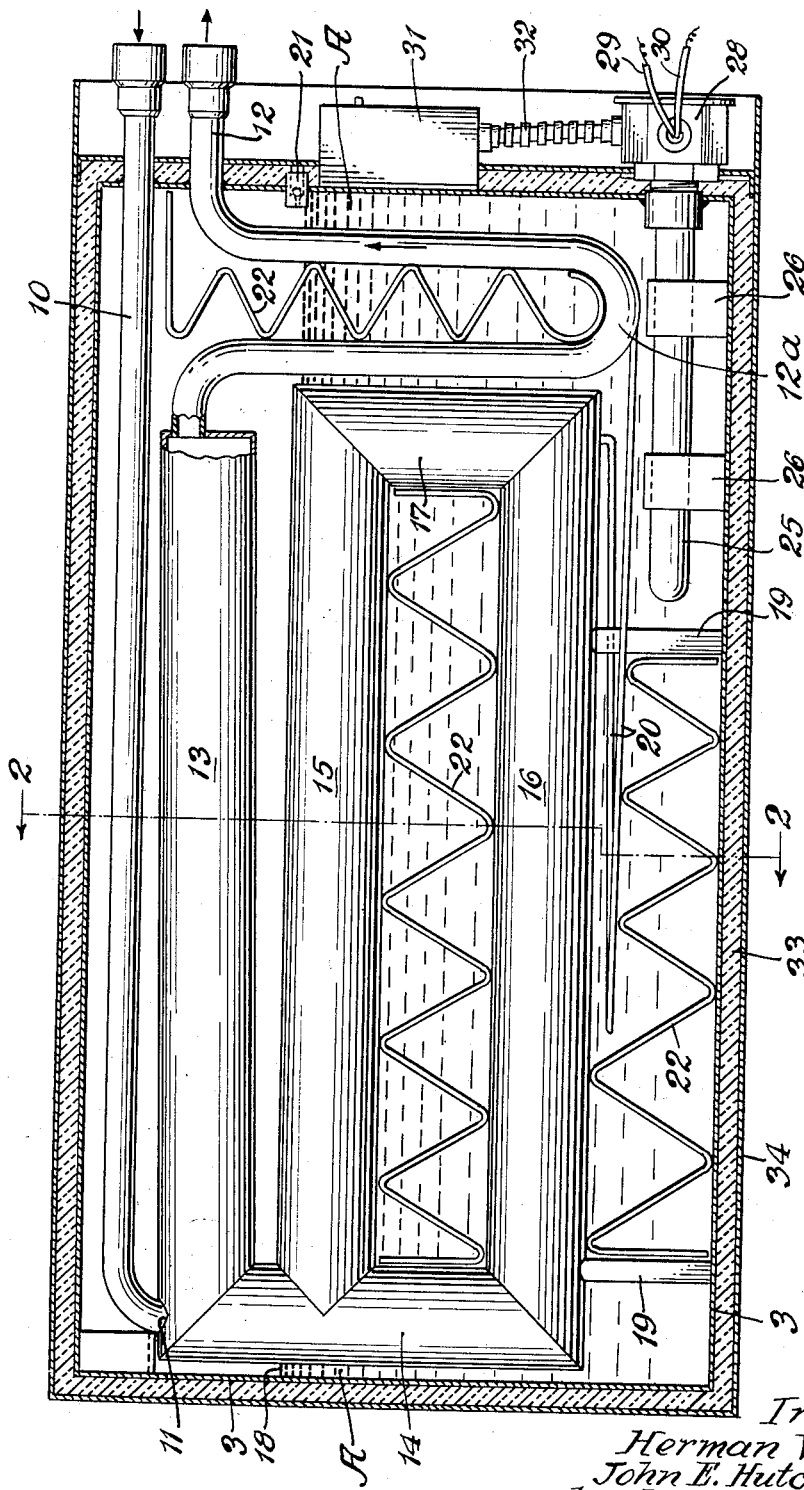
Figure 1 is a vertical, longitudinal section with parts in elevation.

Referring to the drawings, we illustrate a plate or casing or housing structure shown as including two plate side walls 1 and 2. The plate side walls are suitably connected about their edges in gas-tight relationship, for example, by a circumferential wall 3, which may be formed by flanges of the plate side walls. A gas tight chamber is thereby formed. It will be understood that the outer housing or plate may be formed in a variety of ways, but the structure herein described and shown is compact, strong and efficient.

Within the housing or plate thus formed we illustrate a body of heat absorbing or heat storing material which may, for example, be a liquid, as indicated at A in Figure 1. The plate is shown as set on edge, with the liquid extending to a substantial depth in the interior of the plate. We may employ water or alcohol, or any other suitable liquid or solution.

In heat exchange relation with the body of heat storage liquid A we have illustrated an evaporator coil or passage system to which a fluid may be delivered for heat exchange purposes. When our device is employed, for example, in a defrosting operation in a refrigerating circuit, refrigerant, with entrained liquid, may be returned from an evaporator of a refrigerating system to the heat exchange plate herein shown. It may be received, for example, by the inlet duct or conduit 10, which extends, as at 11, to the lower end of an evaporator tube or length 13. The length or arm 13 is slightly downwardly inclined toward its left end, referring to the position of the parts as shown in Figure 1. It there connects to a down pipe or arm 14 which is shown as forming part of a loop having an upper horizontal component 15, a lower horizontal component 16, and an opposite end connection 17. In the particular embodiment of our invention herein shown the liquid level, as at 18, includes substantially or entirely the loop formed by the arms 15 and 16, and the connecting portions 14 and 17, but is lower than the arm 13. However, it is a matter of choice how high the liquid level 18 extends, depending upon the results desired and the flow of liquefied refrigerant to be dealt with. The lower arm 16 of the above described coil system is provided with coil legs or supports 19 which may be proportioned to position the coil system at the desired level in the plate. An oil drain tube 20 extends from the bottom of the arm 16 to a lower portion of the bend or trap 12a in the discharge pipe which extends from the upper or right hand end of the arm 13.

In considering the relation of the evaporator coil to the plate, it will be seen, as in Figure 2, that the elements 13 to 17, inclusive, are shown as formed of cylindrical tubes or pipes having a diameter such that when the plate walls 1 and 2 are in the desired position they engage all elements of the evaporator coil. If desired, we can employ rectangular pipes or tubes. We find it advantageous to employ excess outside atmospheric pressure to urge the plate side walls 1 and 2 into contact with the pipes or tubes 13 to 17, inclusive. A practical way of obtaining this result is to partially exhaust the interior of the plate. We provide, for example, a vacuum bib or fitting assembly 21, the details of which do not form part of the present invention but through which air in the interior of the plate may be partially evacuated by any suitable means, and the resultant vacuum maintained. In order to provide spacing means to prevent inward deformation of the plate side walls we illustrate filler bars or internal wall support members 22 which are shown as forming zig-zags and which extend between the plate side walls.

Assuming that more or less liquefied refrigerant is delivered to the top arm or evaporator coil element 13, at 11, we employ the liquid body A as a heat storage unit for supplying to the liquefied refrigerant the heat necessary to vaporize or evaporate it. The gaseous and reevaporated refrigerant flows through the outlet pipe 12 as a gas. It may be delivered, for example, to the suction side of a compressor.

In order to heat the liquid body A we provide the following means: The pipe 25 is mounted within any suitable spacers 26, and is open at its outer end to permit the insertion therein of any suitable resistance element, more or less diagrammatically shown at 27. This resistance element or electrical heater may have an outer portion or component 28, the details of which do not of themselves form part of the present invention. It will be understood that it is connected in any suitable power circuit, including, for example, the conductors 29 and 30, diagrammatically illustrated in Figure 4. 31 more or less diagrammatically illustrates a preferably adjustable limit control or heat sensitive assembly, suitably connected to the electric heater element 28, for example, by the conduit 32. The resistance 27, within the pipe 25, is effective to supply heat to the liquid or storage body A. The circuit for the resistance 27 is controlled by the heat responsive limit control 31, to the end that the temperature of the liquid body A is maintained, within narrow limits, at a predetermined optimum temperature. If desired, the adjustment feature may be omitted. However, we prefer to employ an adjustable control. Whether by factory setting, or by adjustment on the job, the limit control 31 may be set to hold the storage body A at whatever temperature is desired.

Any suitable heat insulating means may be employed. We illustrate, for example, an interior insulating coating 33 which forms an insulating shell about the chamber surrounded by an outer jacket 34 which may be comprised of plates. If desired, the outer jacket 34, with or without the insulating coating, may be carried outwardly to form a shield about the electric heater element 28 and the limit control 31. The limit control is shown as fixed in relation to and abutting the plate side wall 3, to provide accurate temperature control.

It will be realized that, whereas, we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing. It will be understood, for example, that any suitable heat storage body, preferably, but not necessarily, liquid, may be employed. We do not wish to be limited to any specific wiring circuit or heater. We consider it essential, however, that a heater and a thermostatic control therefor be preferably unitarily associated with the plate. The resistance unit is, preferably, removable for repair or replacement.

The use and operation of the invention are as follows:

In automatic refrigeration systems it is common to employ a compressor to deliver a volatile refrigerant, in a gaseous state, to a suitable condenser and receiver. The hot gas is condensed in the condenser and gathers in the receiver as a liquid. This liquid may then be delivered to a suitable evaporator, not herein shown, through an expansion valve or capillary, or any other suitable means, for causing a pressure drop. The liquid refrigerant evaporates in the evaporator and returns as a gas to the suction side of the compressor. Such evaporators may be defrosted by by-passing the condenser and delivering hot gas to the evaporator. This hot gas serves to defrost the evaporator, but it, at least partially, liquefies or condenses in the course of the defrosting operation. The volatile refrigerant must then be completely re-evaporated before it returns to the suction side of the compressor, to avoid damage to the compressor. When our structure is used for such a purpose, the liquid refrigerant is received by the inlet 10 and flows into the evaporator coil or boiler, including the elements 13 to 17, inclusive. This evaporator may more appropriately be called a re-evaporator. This boiler or re-evaporator coil may be largely or completely immersed in a heat storage body such as the liquid body A. In the particular structure as shown in Figure 1 the element 13 is above the liquid level, whereas the elements 15 and 16, and their end connections 17, are practically completely immersed, and most of the connector element 14 is immersed. The heat of the body A is maintained at a proper temperature effective completely to vaporize whatever liquefied refrigerant is delivered to the above described evaporator coil. This temperature is provided, for example, by the resistance 27, which is controlled by the preferably adjustable limit control 31. It is important to break the electrical circuit to the heater when the storage body or solution A has been brought to a predetermined temperature, which must be held below a certain danger limit. There is danger in having the temperature of the solution too high, since suction gas, returning from the evaporator which is being defrosted, might pick up too much heat from the heat storage body A, and thereby become superheated. This condition may have a tendency to damage the compressor valves. Hence the importance in practice of the use of an adjustable temperature sensitive device, so that if such a superheat condition exists on any individual installation the control setting may be changed so that the electrical circuit to the heater is broken at a solution or heat storage temperature sufficiently low to prevent undesirable conditions of superheat.

We wish to emphasize that the trap or bend 12a has several advantages. Since it dips down into the heat storage body it subjects the flowing gas and any entrained droplets to the heat storage effect. This is effective to evaporate such droplets of liquid as may be entrained. In the next place, the bend is effective in picking up oil from the oil duct 20. And, finally, it assists in recovering such refrigerant vapor as may be trapped in the bottom of the element 16.

In connection with thermostat adjustment, we wish also to emphasize that adjustments are made as necessary to compensate for variations in ambient temperature, while preventing damage to the compressor by superheat. In a sense, there must be a compromise between the quickest possible vaporization of the return liquid and the prevention of overheating the gas returned to the compressor. Whereas we find it convenient and efficient to control the temperature of the heat storage mass, and thus of the return gas to the compressor, by sensing the temperature of the heat storage mass, it will be understood that, if desired, we may sense the temperature of the return gas flow itself, to prevent superheat.

We claim:

1. An automatically controlled heat exchanger for evaporating unvaporized refrigerant in a heat exchange cycle including a narrow chamber formed by top, bottom, and side walls hermetically sealed at their junctions to thereby form a chamber substantially longer than it is wide and substantially wider than it is thick, an insulating shell formed by top, bottom and side walls surrounding the chamber to thereby insulate the interior of the chamber from the temperature variations of the ambient atmosphere, one shell wall being cut away to thereby expose a small area of the chamber wall, a heat storage liquid within the chamber, a refrigerant vaporizing element positioned within the chamber and at least partially immersed within the heat storage liquid, said refrigerant vaporizing element comprising a plurality of lengths of connected, substantially parallel tubing, said tubing being in good heat exchange relationship with the interior surfaces of the walls of the chamber, a fitting for maintaining a vacuum within the chamber, internal wall support members within the chamber having a width substantially equal to the width of the tubing to thereby prevent deformation of the refrigerant vaporizing element, an inlet duct extending into the chamber and opening into the refrigerant vaporizing element, an outlet duct extending into the chamber and opening into the tubing at a point substantially remote from the admission point of the inlet conduit, a heating assembly having a heating element projecting through a wall of the chamber and into the heat storage liquid, said heating element being shielded from direct contact with the heat storage liquid, said heating assembly further including an exterior housing adapted to connect the heating element to a source of current, a removable heat sensitive assembly positioned on the exposed area of the chamber wall in direct heat exchange relationship with the chamber wall, said area being positioned substantially entirely below the level of the heat storage liquid within the chamber, said heat sensitive assembly having a temperature responsive device responsive to the temperature of the heat storage liquid as transferred through the chamber wall, a connection between the heat responsive device and the heating assembly positioned on the exterior of the insulating shell, said heat sensitive assembly containing means for connecting and disconnecting the heating element to the source of current in response to a variation of the temperature of the heat storage liquid within a preset, determinable range.

2. An automatically controlled heat exchanger for evaporating unvaporized refrigerant in a defrosting cycle including a narrow chamber formed by top, bottom, side and end walls hermetically sealed at the junctions to thereby form a chamber substantially longer than it is wide and substantially wider than it is thick, an insulating shell formed by top, bottom, side and end walls surrounding the chamber to thereby insulate the interior of the chamber from the temperature variations of the ambient atmosphere, said top, bottom and side shell walls having exterior plates extending outwardly beyond one end of the insulating shell to thereby form a protective shield over said one end, said one end of the insulating shell wall being cut away to thereby expose a small area of the chamber end wall, a heat storage liquid within the chamber, a refrigerant vaporizing element positioned within the chamber and at least partially immersed within the heat storage liquid, said refrigerant vaporizing element comprising a plurality of lengths of connected, substantially parallel tubing, said tubing being in good heat exchange relationship with the interior surfaces of the walls of the chamber, a fitting for maintaining a vacuum within the chamber positioned on the shielded shell and chamber end walls, internal wall support members within the chamber having a width substantially equal to the width of the tubing to thereby prevent deformation of the refrigerant vaporizing element, an inlet duct extending through the shielded end of the heat exchanger and opening into the refrigerant vaporizing element, an outlet duct extending through the shielded end of the heat exchanger and opening into the tubing at a point substantially remote from the admission point of the inlet conduit, a heating assembly including a resistance heating element projecting through the shielded end of the heat exchanger and into the heat storage liquid, said resistance heating element being shielded from direct contact with the heat storage liquid by a fluid tight covering, said heating assembly further including a housing positioned on the shielded end wall of the heat exchanger adapted to connect the resistance heating element to a source of current, a removable heat sensitive assembly positioned on the exposed area of the chamber wall in direct heat exchange relationship with the chamber wall, said area being positioned below the level of the heat storage liquid within the chamber, said heat sensitive assembly having a temperature responsive device responsive to the temperature of the heat storage liquid as transferred through the chamber wall, a connection between the heat responsive device and the heating assembly, said connection being positioned on the exterior of the heat exchanger, said heat responsive device containing circuit means for connecting and disconnecting the resistance heating element to a source of current in response to a variation of temperature of the heat storage liquid within a preset, determinable range.

References Cited in the file of this patent
UNITED STATES PATENTS

| | | |
|---|---|---|
| 1,896,953 | Hassell | Feb. 7, 1933 |
| 2,582,134 | Kimmell et al. | Jan. 8, 1952 |
| 2,690,327 | Sardeson | Sept. 28, 1954 |
| 2,701,455 | Kleist | Feb. 8, 1955 |
| 2,726,515 | Kleist | Dec. 13, 1955 |